United States Patent
Peck et al.

(10) Patent No.: US 8,930,898 B2
(45) Date of Patent: *Jan. 6, 2015

(54) DECLARATIVE COMMANDS USING WORKFLOWS

(71) Applicant: Microsoft Corporation, Redmond, WA (US)

(72) Inventors: David K. Peck, Seattle, WA (US); Randy Kimmerly, Woodinville, WA (US); Christopher L. Anderson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 34 days.

This patent is subject to a terminal disclaimer.

(21) Appl. No.: 13/724,070

(22) Filed: Dec. 21, 2012

(65) Prior Publication Data

US 2013/0191811 A1    Jul. 25, 2013

Related U.S. Application Data

(63) Continuation of application No. 12/016,400, filed on Jan. 18, 2008, now Pat. No. 8,341,598.

(51) Int. Cl.
*G06F 9/44* (2006.01)
*G06F 9/45* (2006.01)
*G06F 9/445* (2006.01)

(52) U.S. Cl.
CPC ... *G06F 8/31* (2013.01); *G06F 8/38* (2013.01)
USPC ........... 717/117; 717/100; 717/102; 717/106; 717/143; 717/162; 717/176

(58) Field of Classification Search
None
See application file for complete search history.

(56) References Cited

U.S. PATENT DOCUMENTS

| | | | |
|---|---|---|---|
| 7,137,099 B2 | 11/2006 | Knight et al. | |
| 7,155,720 B2 | 12/2006 | Casati et al. | |
| 7,197,515 B2 | 3/2007 | Rivers-Moore et al. | |
| 7,451,432 B2 * | 11/2008 | Shukla et al. | 717/106 |
| 7,565,640 B2 | 7/2009 | Shukla et al. | |
| 7,590,972 B2 | 9/2009 | Axelrod et al. | |
| 7,624,349 B2 | 11/2009 | Seemann et al. | |
| 7,631,291 B2 | 12/2009 | Shukla et al. | |

(Continued)

OTHER PUBLICATIONS

Bruce Bukovics, *Pro WF Windows Workflow in NET 3.0*, 2007 Chapters 4, 9, 11 and 16 Available on page http://www.springerlink._com/content/978-1-59059-778-1/contents/ Jul. 1, 2011.

(Continued)

*Primary Examiner* — Don Wong
*Assistant Examiner* — Anibal Rivera
(74) *Attorney, Agent, or Firm* — Nicholas Chen; Brian Haslam; Micky Minhas

(57) ABSTRACT

Declaratively implementing a command. A method includes declaring an input gesture in a declarative programming language. Declaring an input gesture includes declaring one or more user performed actions. A command name is declared in a declarative programming language. A workflow is declared in a declarative programming language. Declaring a workflow includes declaring schedulable activities that are to be performed without specific specifications of the low level algorithms that are used to accomplish the activities. In an alternative example, workflows may be declared by declaring a wrapper to wrap imperative programming commands. The declared input gestures are bound with the declared workflow through the declared command name.

20 Claims, 1 Drawing Sheet

(56) References Cited

U.S. PATENT DOCUMENTS

| | | | |
|---|---|---|---|
| 7,669,177 B2* | 2/2010 | Gerber et al. | 717/100 |
| 7,949,991 B1 | 5/2011 | Kuwamoto et al. | |
| 8,108,834 B2* | 1/2012 | Oren et al. | 717/117 |
| 8,296,744 B2* | 10/2012 | Langworthy et al. | 717/143 |
| 2005/0203958 A1* | 9/2005 | Mitchell et al. | 707/104.1 |
| 2005/0216881 A1* | 9/2005 | Sankaran et al. | 717/102 |
| 2005/0246686 A1 | 11/2005 | Seshadri et al. | |
| 2006/0074734 A1 | 4/2006 | Shukla et al. | |
| 2007/0038492 A1 | 2/2007 | Ryan et al. | |
| 2007/0061741 A1 | 3/2007 | Kothari et al. | |
| 2007/0067308 A1 | 3/2007 | Amrhein et al. | |
| 2007/0112829 A1* | 5/2007 | Sanabria et al. | 707/102 |
| 2007/0168375 A1 | 7/2007 | Yu | |
| 2007/0250811 A1 | 10/2007 | Ahs et al. | |
| 2007/0261018 A1* | 11/2007 | Sanghvi et al. | 717/100 |
| 2008/0162565 A1* | 7/2008 | Waguet | 707/104.1 |
| 2009/0007095 A1* | 1/2009 | Alverson et al. | 717/176 |
| 2009/0164985 A1* | 6/2009 | Balko et al. | 717/162 |

OTHER PUBLICATIONS

Chris Andrade et al., *WPF Programming*, 2007, [Retrieved on Jul. 2, 2012]. Retrieved from the internet: <URL: http://searchtitles.vmg.ppsua/l/%D0%9A%D0%BE%D0%BF%D1%8C%D1%8E%DI%82% D0%B5%D1%80%D1%8B%D0%98%D1%81%D0%B5% D1%82%D0%B8/Microsoft/WPF/Wrox.Professional.WPF.Programming.May.2007.pdf> 482 Pages.

Andrew Troelsen., Introducing Windows Presentation Foundation and XAML, 2008, [Retrieved on Jul. 2, 2012]. Retrieved from the internet: <URL: http://www.springerlink.com/content/u464245h28406h67/fulltext.pdf> 56 Pages.

Adobe Systems Incorporated, "Adobe Livecycle Assembler" 2006 Adobe Systems Incorporated, 2 pages [Accessed Jan. 18, 2008].

Allen, Scott, *"Authoring Workflows"*, OdeToCode.com, Mar. 2006, 12 pages.

Allen, Scott, *"Windows Workflow and XAML"*, OdeToCode.com, Mar. 2006, 9 pages.

U.S. Appl. No. 12/016,400, Aug. 31, 2012, Notice of Allowance.
U.S. Appl. No. 12/016,400, Dec. 5, 2011, Office Action.
U.S. Appl. No. 12/016,400, Jul. 1, 2011, Office Action.

* cited by examiner

DECLARATIVE COMMANDS USING WORKFLOWS

CROSS-REFERENCE TO RELATED APPLICATIONS

This application is a continuation of U.S. application Ser. No. 12/016,400, entitled "DECLARATIVE COMMANDS USING WORKFLOWS", which was filed on Jan. 18, 2008, and which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Declarative computer programming allows a programmer to define the results or goals of a program, but does not necessarily define how those results or goals are achieved. For example, HTML web pages are declarative because they describe what the page should contain (e.g., title, text, images) but not how to actually display the page on a computer screen. In contrast, imperative programming requires a programmer to specify low level algorithms, or to define new algorithms that can be used to achieve a result or goal. In short, imperative programs explicitly specify an algorithm to achieve a goal, while declarative programs explicitly specify the goal and leave the implementation of the algorithm to framework software where the declarative programming is executed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method of declaratively implementing a command. The method includes declaring an input gesture in a declarative programming language. Declaring an input gesture includes declaring one or more user performed actions. A command name is declared in a declarative programming language. A workflow is declared in a declarative programming language. Declaring a workflow includes declaring schedulable activities that are to be performed without specific specifications of the low level algorithms that are used to accomplish the activities. The declared input gesture are bound with the declared workflow through the declared command name.

Another embodiment is performed in a computing environment where an application is executing. The method includes acts for inspecting a workflow to determine if the workflow is capable of performing useful work given the current state of the application. The method includes analyzing one or more activities of a workflow. The workflow includes declarations of activities that are to be performed without specific specifications of the low level algorithms that are used to accomplish the activities. The workflow is bound to a declaratively defined input gesture through a declaratively defined command name. The current state of an application is analyzed. The current state of the application is compared to the one or more activities of the workflow. Based on the act of comparing, a determination is made that a workflow can perform work by performing one or more activities in the workflow, given the current state of the application. Once it has been determined that a workflow can perform work, then additional functionality can be implemented. For example, a user interface for a command can be made active if the workflow bound to the command is able to perform work. Alternatively, a user interface for a command can be made inactive if the workflow bound to the command is unable to perform work.

In an alternative embodiment, a workflow includes declarations of a activities that are to be performed by declaring a delegate activities in wrapper in a declarative programming language for low level imperative algorithms that are used to accomplish computing tasks. The workflow wrapper is bound to a declaratively defined input gesture through a declaratively defined command name.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein implement functionality whereby declarative programming can be used to accomplish functionality similar to imperative programming. In particular, embodiments may include functionality for implementing gestures in declarative programming. In one embodiment, this may be accomplished by linking gestures to workflow activities through commands via command binding.

Declarative programming may often include workflows. Workflows usually include declarations of activities that are to be performed without specific specifications of the low level algorithms that are used to accomplish the activities. An activity is defined by a unit of executable code including one or more pulses of work. One of the ways an activity can execute one or more pulses of work is through the scheduling of child activities. Thus, a workflow includes a collection of activities, sometimes called workflow activities.

A composite activity including a number of child activities enables custom control flows that can be implemented by scheduling child activities 0, 1 or n times as determined by the composite activity.

Input gestures include motions using human interface device interactions, such as button clicks, keyboard presses, and menu item selections. In some embodiments, a command is simply a name to which input gestures and command bindings can refer. A command binding ties a command (via the command name) to a workflow. As described previously, a workflow activity is a unit of schedulable work. An activity is a "behavior" as described herein. Notably, in declarative programming, because activities are performed without specific specifications of the low level algorithms that are used to accomplish the activities, activities defined in a workflow are executed in a framework which determines what low level algorithms should be used to accomplish the stated goal of a given activity. In one embodiment, the Windows Workflow Foundation (WF) provided by Microsoft® Corporation of Redmond Wash. provides a framework for defining and executing activities.

Figure 1:
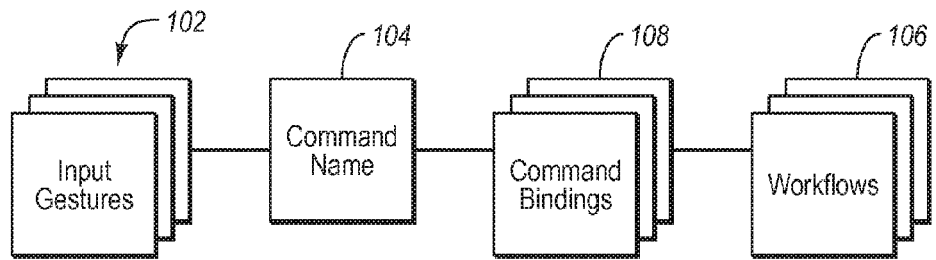
FIG. 1 illustrates a graphical representation of input gesture binding with declaratively defined workflows.

Referring now to FIG. 1, a graphical example of how input gestures are bound to workflows is illustrated. In the example illustrated in FIG. 1, several different declared objects are illustrated. The declared objects typically include declared goals of the declared objects without specific low-level imperative programming instructions defining how the goals are obtained. However, one exception will be illustrated later herein where a workflow wrapper can be used to wrap imperative code to allow the imperative code to be bound to declared command names and input gestures. FIG. 1 illustrates a number of input gestures 102. The input gestures 102 define user activities that may be performed. For example, an input gesture may be a keystroke selection such as ctrl-S. Another gesture may be a right-mouse click followed by a left mouse click selecting a save command. Yet another gesture may include a menu selection of a save command. As will be illustrated, all of these input gestures 102 may be bound to a single command 104, which is then bound to one or more appropriate workflows 106. With a number of different workflows 106 for different contexts, the same command name may be used to bind various input gestures 102 with various workflows 106.

FIG. 1 further illustrates a command 104, which in particular is a declared name. For example, the command 104 may be named "Save."

FIG. 1 further illustrates workflows 106. A workflow 106 includes a number of declared activities. As noted previously, an activity is defined by a unit of executable code including one or more pulses of work. One of the ways an activity can execute one or more pulses of work is through the scheduling of child activities. The activities defined in the workflow, in the example illustrated, may include various activities for performing a save operation. It should be noted that the workflow 106 may be defined for a particular circumstance. For example, a particular workflow may be applicable when a document editing program is in a state where a user a user can add textual information to a document. In this case, the workflow may include activities, such as memory access, disk read and write operations, etc., for saving the present state of the document. A different workflow may be used when the document editing program is in a state where a user is able to edit user preferences for the document editing program. This workflow example may include activities that allow user preferences to be saved. A workflow 106 can be bound to input gestures through the command name 104 and the command binding 108. This allows arbitrary input gestures to be bound to arbitrary workflows through a defined command name.

The definition of a command as "just a name" is a unique feature used to implement some embodiments. Commands act as simple points of indirection and can be late-bound, i.e. bound at runtime. By allowing gestures and bindings to rendezvous on names, it becomes simple to decouple references to the command and scatter them throughout declarative code.

Bindings rendezvous on commands indirectly such that it is possible to provide multiple bindings, and as a result multiple behaviors, for a given command. This allows developers to respond to, for example, a "Save As" command differently depending on context. The specific details of "routing," i.e. the process of finding the appropriate command binding to execute are, in some embodiments, based on Windows Presentation Foundation (WPF) library of the .Net framework designs available from Microsoft Corporation of Redmond Wash.

Some embodiments include a notion of command "activation." A command is active if its application's state is suitable for running the command. For example, a "save as" command should not be active unless a document is open and has been edited since it was last saved.

Some embodiments provide a mechanism for inspecting activities of a workflow to determine whether their context requirements are satisfied. For example, in one embodiment, a workflow may include an activity which is a top level rule. Embodiments may be implemented to extract out the rule's predicate to determine whether the rule is ready to execute. If so, the command 104 is considered "active."

Command systems in modern shell frameworks expect that command behavior will be implemented imperatively. By tying command bindings to a workflow system with schedulable activities, some embodiments make it possible to fully implement command behavior in a declarative language (such as XAML (Extensible Application Markup Language)).

To provide support for developers who wish to continue writing imperative command handlers, an "imperative method activity wrapper" may also be provided. An imperative activity wrapper includes declarative code that is used to wrap imperative code. Thus, the declarative command name and declaratively defined input gestures can be bound to a declarative workflow wrapper, which wraps imperative commands.

The following discussion now refers to a number of methods and method acts that may be performed. It should be noted, that although the method acts may be discussed in a certain order, no particular ordering is necessarily required unless specifically stated, or required because an act is dependent on another act being completed prior to the act being performed.

Figure 2:
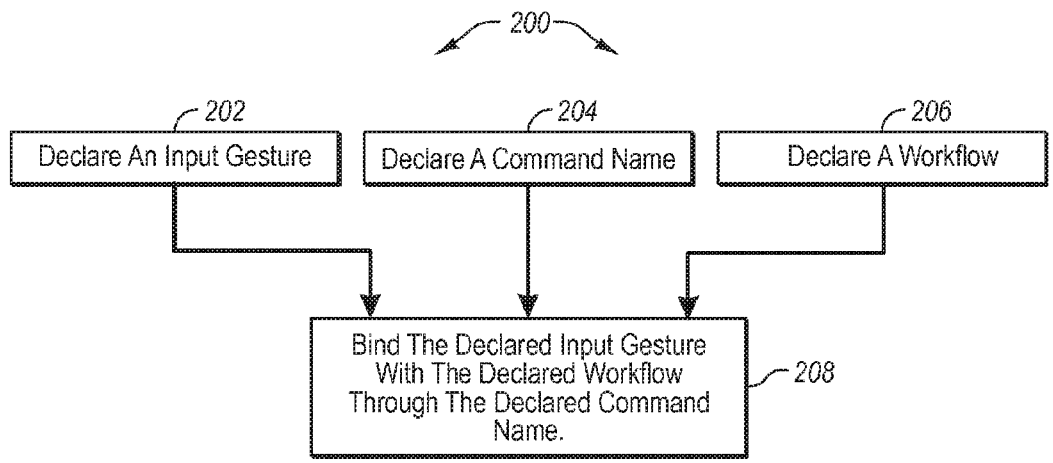
FIG. 2 illustrates a method of binding input gestures and workflows.

Referring now to FIG. 2, method 200 of declaratively implementing a command is illustrated. The method 200 includes declaring an input gesture (act 202). The input gesture may be declared in a declarative programming language. Declaring an input gesture includes declaring one or more user performed actions. For example declaring an input gesture may include, for example, declaring one or more of keystrokes, mouse interactions, or human interface device interactions. This may include menu selections or other interactions or selections. In one embodiment, this may be accomplished by using features of the WPF library of the .Net framework available from Microsoft Corporation of Redmond Wash.

The method 200 further includes declaring a command name (act 204). The command name may be declared in a declarative programming language. The command name is a name given to a particular command that can be used to identify the command. A command name may be unique in the sense that, in some embodiments, it only needs be declared once in an application. It is an identifier for a particular type of action. For example, "Save As" means the same thing to the user everywhere in an application, even if the specifics of how "Save As" behaves changes depending on the application's state.

The method 200 further includes declaring a workflow (act 206). The workflow is declared in a declarative programming language. Declaring a workflow includes declaring schedulable activities that are to be performed without specific specifications of the low level algorithms that are used to accomplish the activities.

The method 200 further includes binding the declared input gesture with the declared workflow through the declared command name (act 208).

In one embodiment of the method 200 declaring an input gesture in a declarative programming language, declaring a command name in a declarative programming language, and declaring a workflow in a declarative programming language may each include declaring XML qualified names. The use of XML qualified names is beneficial primarily because it avoids conflicts in declarations that are written by multiple separate parties. In applications that are highly composed, i.e. they are comprised of components that are written by multiple third parties and then "tied together" via yet another developer, it may be important that no two parties are likely to define a command with the same name.

The method 200 may also be implemented such that declaring a workflow includes declaring the workflow such that one or more activities in the workflow can be analyzed with respect to a current operating state of an application to determine if the workflow can perform work given the current operating state of the application. For example, it may be useful, as noted previously, to determine whether context requirements are satisfied. As noted, some commands should not be available if it does not make sense to have them available. One example includes save commands when there is nothing new to save. In one embodiment of the method 200 this may be accomplished where declaring the workflow such that one or more activities in the workflow can be analyzed with respect to a current operating state of an application to determine if the workflow can perform work given the current operating state of the application, includes declaring one or more rules in a top level activity of the workflow. In one embodiment, this may be accomplished by declaring a watch in a declarative programming language. The watch is configured to monitor application state with respect to a predicate of the rules and to provide an indication when the predicate is satisfied indicating that the workflow is enabled to perform work.

In an alternative embodiment, the method 200 may be practiced to include declaring an alert mechanism in a declarative programming language. The alert mechanism is configured to monitor application state and to provide an alert when the application is in a predetermined state. This can be used to determine that a rule in a workflow should be evaluated to determine if a particular command is active.

Figure 3:
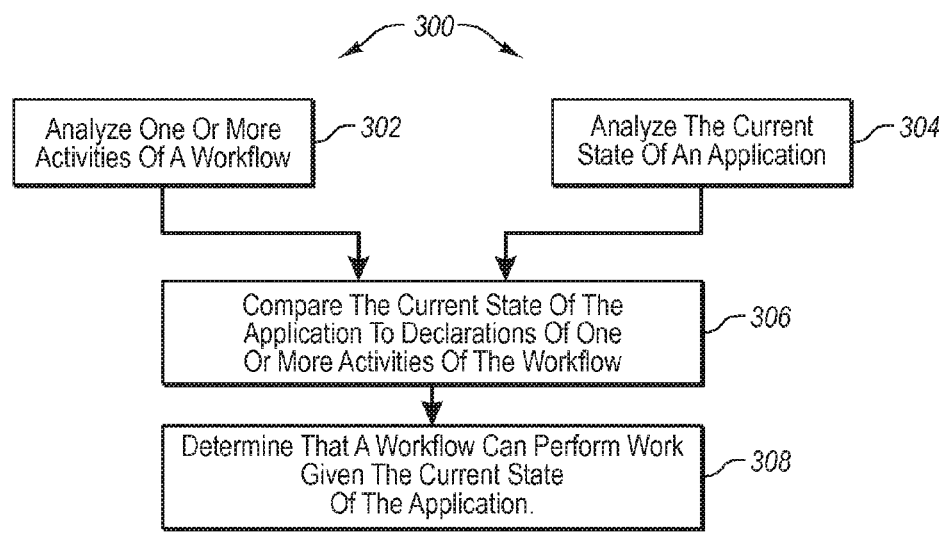
FIG. 3 illustrates a method of inspecting a workflow to determine whether or not the workflow can perform work.

Referring now to FIG. 3, another embodiment is illustrated. The embodiment illustrated in FIG. 3 is a method that may be practiced in a computing environment where an application is executing. The method 300 includes acts for inspecting a workflow to determine if the workflow is capable of performing useful work given the current state of the application. The method 300 includes analyzing one or more declarations of activities of a workflow (act 302). The workflow includes declarations of activities that are to be performed without specific specifications of the low level algorithms that are used to accomplish the activities. The workflow is bound to a declaratively defined input gesture through a declaratively defined command name.

The method further includes an act of analyzing the current state of an application (act 304). For example, an analysis may be performed to determine if an application is in a text editing state, a state within a text editing state where no text has been added, deleted, or otherwise edited, a user preference selection state, etc.

The method 300 further includes comparing the current state of the application to the one or more declarations of activities of the workflow (act 306). For example, the predicate of a rule declared in a workflow may be compared to application state to determine if the predicate of the rule is satisfied. Based on the act of comparing, the method 300 further includes determining that a workflow can perform work. The workflow can perform work by performing one or more activities in the workflow, given the current state of the application (act 308).

A noted above, in the method 300, analyzing one or more declarations of activities of a workflow may include inspecting a top level activity in the workflow. The top level activity is a rule including one or more conditions. The method may further include determining that a condition is satisfied.

In an alternative embodiment, analyzing one or more declarations of activities of a workflow may include inspecting a top level activity in the workflow. The top level activity is a rule including one or more conditions. The method further includes setting up a watch to analyze conditions of the application based on top level rule. A notification is received from the watch that a condition has been met to satisfy the rule.

In yet another alternative embodiment, analyzing one or more declarations of activities of a workflow may include inspecting a top level activity in the workflow. The top level activity is a rule including one or more conditions. This particular embodiment of the method 300 further includes performing operations on data, evaluating the results of the operations on the data, and based on the results, determining that a condition is satisfied.

As noted previously, embodiments may also be implemented for embodiments where a workflow wrapper is used for imperative code. For example the act 302 of analyzing one or more declarations of activities of a workflow may be performed where the workflow includes declarations of a activities that are to be performed by declaring a wrapper in a declarative programming language for low level imperative algorithms that are used to accomplish computing tasks. The workflow wrapper is bound to a declaratively defined input gesture through a declaratively defined command name.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for performing a method of declaratively implementing a link between a plurality of input gestures and a plurality of units of schedulable work, the computer program product comprising one or more physical computer-readable storage devices having stored thereon instructions which when executed by one or more computer processors perform the method, the method comprising:
    declaring a command name in a declarative programming language, wherein the command name is just a name and wherein the command name can be bound to a plurality of input gestures and the command name can be bound to a plurality of workflow activities in order to provide a link between each of the plurality of input gestures and each of the plurality of workflow activities, and wherein the command name is late-bound such that the binding of the command name occurs at runtime;
    declaring an input gesture in a declarative programming language such that the input gesture is associated with one or more user performed actions through an interface;
    declaring a workflow in a declarative programming language, wherein the workflow comprises a unit of schedulable work;
    binding the declared input gesture to the command name such that the input gesture is linked through the command name to each workflow activity which is bound to the command name; and
    binding the declared workflow to the command name such that the workflow is linked through the command name to each input gesture that is bound to the command name.

2. The computer program product of claim 1, wherein declaring a workflow comprises declaring the workflow such that one or more declarations of activities in the workflow can be analyzed with respect to a current operating state of an application to determine if the workflow can perform work given the current operating state of the application.

3. The computer program product of claim 2, wherein declaring the workflow such that one or more declarations of activities in the workflow can be analyzed with respect to a current operating state of an application to determine if the workflow can perform work given the current operating state of the application, comprises declaring one or more rules in a top level activity of the workflow.

4. The computer program product of claim 3, further comprising declaring a watch in a declarative programming language, the watch configured to monitor an application state with respect to a predicate of the one or more rules and to provide an indication when the predicate is satisfied indicating that the workflow is enabled to perform work.

5. The computer program product of claim 3, further comprising declaring an alert mechanism in a declarative programming language, the alert mechanism configured to monitor application state and to provide an alert when the application is in a predetermined state.

6. The computer program product of claim 1, wherein declaring a workflow comprises declaring a workflow wrapper for imperative programming code.

7. A system for performing a method of declaratively implementing a link between a plurality of input gestures and a plurality of units of schedulable work, the system comprising one or more computer processors and physical computer readable media having stored thereon instructions which when executed by the one or more computer processors perform the method, the method comprising:
    declaring a command name in a declarative programming language, wherein the command name is just a name and wherein the command name can be bound to a plurality of input gestures and the command name can be bound to a plurality of workflow activities in order to provide a link between each of the plurality of input gestures and each of the plurality of workflow activities, and wherein the command name is late-bound such that the binding of the command name occurs at runtime;
    declaring an input gesture in a declarative programming language such that the input gesture is associated with one or more user performed actions through an interface;
    declaring a workflow in a declarative programming language, wherein the workflow comprises a unit of schedulable work;
    binding the declared input gesture to the command name such that the input gesture is linked through the command name to each workflow activity which is bound to the command name; and
    binding the declared workflow to the command name such that the workflow is linked through the command name to each input gesture that is bound to the command name.

8. The system of claim 7, wherein declaring a workflow comprises declaring the workflow such that one or more declarations of activities in the workflow can be analyzed with respect to a current operating state of an application to determine if the workflow can perform work given the current operating state of the application.

9. The system of claim 8, wherein declaring the workflow such that one or more declarations of activities in the workflow can be analyzed with respect to a current operating state of an application to determine if the workflow can perform work given the current operating state of the application, comprises declaring one or more rules in a top level activity of the workflow.

10. The system of claim 9, further comprising declaring a watch in a declarative programming language, the watch configured to monitor an application state with respect to a predicate of the one or more rules and to provide an indication when the predicate is satisfied indicating that the workflow is enabled to perform work.

11. The system of claim 9, further comprising declaring an alert mechanism in a declarative programming language, the alert mechanism configured to monitor application state and to provide an alert when the application is in a predetermined state.

12. The system of claim 7, wherein declaring a workflow comprises declaring a workflow wrapper for imperative programming code.

13. A computer program product for performing a method of inspecting a workflow to determine if the workflow is capable of performing useful work given the current state of an application, the computer program product comprising one or more physical computer-readable storage devices having stored thereon instructions which when executed by one or more computer processors perform the method, the method comprising:
   analyzing one or more declarations of activities of a workflow, wherein the workflow includes declarations of activities that are to be performed, wherein the workflow is bound to a declaratively defined input gesture through a declaratively defined command name, wherein the command name is just a name such that the command name can be bound to a plurality of input gestures and the command name can be bound to a plurality of workflow activities in order to provide a link between each of the plurality of input gestures and each of the plurality of activities, and wherein the command name is late-bound such that the binding of the command name occurs at runtime;
   analyzing the current state of an application;
   comparing the current state of the application to the one or more declarations of activities of the workflow; and
   based on the act of comparing, determining that a workflow can perform work, given the current state of the application, wherein the workflow performs work by performing one or more activities in the workflow, and wherein the workflow is invoked to perform the work upon receipt of at least one input gesture bound to the command name.

14. The computer program product of claim 13, wherein analyzing one or more activities of a workflow comprises:
   inspecting a top level activity in the workflow, wherein the top level activity is a rule comprising one or more conditions; and
   determining that a condition is satisfied.

15. A system for performing a method of inspecting a workflow to determine if the workflow is capable of performing useful work given the current state of an application, the system comprising one or more computer processors and physical computer readable media having stored thereon instructions which when executed by the one or more computer processors perform the method, the method comprising:
   analyzing one or more declarations of activities of a workflow, wherein the workflow includes declarations of activities that are to be performed, wherein the workflow is bound to a declaratively defined input gesture through a declaratively defined command name, wherein the command name is just a name such that the command name can be bound to a plurality of input gestures and the command name can be bound to a plurality of workflow activities in order to provide a link between each of the plurality of input gestures and each of the plurality of activities, and wherein the command name is late-bound such that the binding of the command name occurs at runtime;
   analyzing the current state of an application;
   comparing the current state of the application to the one or more declarations of activities of the workflow; and
   based on the act of comparing, determining that a workflow can perform work, given the current state of the application, wherein the workflow performs work by performing one or more activities in the workflow, and wherein the workflow is invoked to perform the work upon receipt of at least one input gesture bound to the command name.

16. The system of claim 15, wherein analyzing one or more activities of a workflow comprises:
   inspecting a top level activity in the workflow, wherein the top level activity is a rule comprising one or more conditions; and
   determining that a condition is satisfied.

17. A computer program product for performing a method of inspecting a workflow to determine if the workflow is capable of performing useful work given the current state of an application, the computer program product comprising one or more physical computer-readable storage devices having stored thereon instructions which when executed by one or more computer processors perform the method, the method comprising:
   analyzing one or more activities of a workflow, wherein the workflow includes declarations of a activities that are to be performed by declaring a wrapper in a declarative programming language for low level imperative algorithms that are used to accomplish computing tasks, and wherein the workflow is bound to a declaratively defined input gesture through a declaratively defined command name, and wherein the command name is just a name such that the command name can be bound to a plurality of input gestures and the command name can be bound to a plurality of workflow activities in order to provide a link between each of the plurality of input gestures and each of the plurality of workflow activities, and wherein the command name is late-bound such that the binding of the command name occurs at runtime;
   analyzing the current state of an application;
   comparing the current state of the application to the plurality of activities of the workflow; and
   based on the act of comparing, determining that a workflow can perform work given the current state of the application, wherein the workflow performs work by performing one or more activities in the workflow, and wherein the workflow is invoked to perform the work upon receipt of at least one input gesture bound to the command name.

18. The computer program product of claim 17, wherein analyzing one or more activities of a workflow comprises:
   opening a top level activity in the workflow, wherein the top level activity is a rule comprising one or more conditions; and
   determining that a condition is satisfied.

19. A system for performing a method of inspecting a workflow to determine if the workflow is capable of performing useful work given the current state of an application, the system comprising one or more computer processors and physical computer readable media having stored thereon instructions which when executed by the one or more computer processors performs the method, the method comprising:

analyzing one or more activities of a workflow, wherein the workflow includes declarations of a activities that are to be performed by declaring a wrapper in a declarative programming language for low level imperative algorithms that are used to accomplish computing tasks, and wherein the workflow is bound to a declaratively defined input gesture through a declaratively defined command name, and wherein the command name is just a name such that the command name can be bound to a plurality of input gestures and the command name can be bound to a plurality of workflow activities in order to provide a link between each of the plurality of input gestures and each of the plurality of workflow activities, and wherein the command name is late-bound such that the binding of the command name occurs at runtime;

analyzing the current state of an application;

comparing the current state of the application to the plurality of activities of the workflow; and based on the act of comparing, determining that a workflow can perform work given the current state of the application, wherein the workflow performs work by performing one or more activities in the workflow, and wherein the workflow is invoked to perform the work upon receipt of at least one input gesture bound to the command name.

20. The system of claim 19, wherein analyzing one or more activities of a workflow comprises:

opening a top level activity in the workflow, wherein the top level activity is a rule comprising one or more conditions; and determining that a condition is satisfied.

* * * * *